United States Patent
Svraka et al.

(10) Patent No.: US 12,152,524 B2
(45) Date of Patent: Nov. 26, 2024

(54) METHOD FOR CONTROLLING THE OPERATION OF AN EXHAUST AFTERTREATMENT SYSTEM

(71) Applicant: VOLVO TRUCK CORPORATION, Gothenburg (SE)

(72) Inventors: Irman Svraka, Tranås (SE); Åsa Högström, Gothenburg (SE); Björn Henriksson, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 159 days.

(21) Appl. No.: 18/067,288

(22) Filed: Dec. 16, 2022

(65) Prior Publication Data
US 2023/0193803 A1    Jun. 22, 2023

(51) Int. Cl.
*F01N 3/20*    (2006.01)
*B01D 53/94*    (2006.01)
(Continued)

(52) U.S. Cl.
CPC ......... *F01N 3/208* (2013.01); *B01D 53/9418* (2013.01); *B01D 53/9431* (2013.01);
(Continued)

(58) Field of Classification Search
CPC ............ B01D 53/9418; B01D 53/9422; B01D 53/9431; B01D 53/9477; B01D 53/9495;
(Continued)

(56) References Cited

U.S. PATENT DOCUMENTS 6,173,568 B1 * 1/2001 Zurbig ................ F01N 13/0097
60/274
6,722,125 B1 * 4/2004 Pfalzgraf .............. F01N 13/009
60/276
(Continued)

FOREIGN PATENT DOCUMENTS

DE    102018132833 A1    6/2020
EP    3406870 A1    11/2018
(Continued)

OTHER PUBLICATIONS

Office Action in corresponding European Application No. 21215896.8 dated Jan. 18, 2024 (4 pages).
(Continued)

*Primary Examiner* — Binh Q Tran
(74) *Attorney, Agent, or Firm* — Venable LLP; Jeffri A. Kaminski

(57) ABSTRACT

A method for controlling the operation of an exhaust aftertreatment system (EATS) in a vehicle is described. The EATS comprises a main SCR catalyst and a pre-SCR catalyst, a pre-injector arranged upstream the pre-SCR catalyst for providing reductant, a bypass channel fluidly connected to the fluid channel and arranged to bypass the pre-SCR-catalyst and the pre-injector, and a valve configured to control a split of exhaust gases between the pre-SCR catalyst and the bypass channel. The method includes determining the amount of ammonia stored in the pre-SCR catalyst; determining the temperature of the main SCR catalyst; when the ammonia storage in the pre-SCR catalyst is below an ammonia storage threshold and the temperature of the main SCR catalyst is above a temperature threshold, injecting reductant by the pre-injector and controlling the valve to allow a flow of exhaust gases to the pre-SCR
(Continued)

catalyst sufficient for transporting the injected reductant to the pre-SCR catalyst for increasing the ammonia storage.

15 Claims, 3 Drawing Sheets

(51) Int. Cl.
    *F01N 3/08*         (2006.01)
    *F01N 3/28*         (2006.01)
    *F01N 13/00*       (2010.01)

(52) U.S. Cl.
    CPC ..... *B01D 53/9477* (2013.01); *B01D 53/9495* (2013.01); *F01N 3/2892* (2013.01); *F01N 13/0093* (2014.06); *B01D 53/9422* (2013.01); *B01D 2255/904* (2013.01); *F01N 3/0871* (2013.01); *F01N 3/0878* (2013.01); *F01N 3/206* (2013.01); *F01N 3/2073* (2013.01); *F01N 2410/02* (2013.01); *F01N 2410/12* (2013.01); *F01N 2410/14* (2013.01); *F01N 2550/06* (2013.01); *F01N 2610/1453* (2013.01); *F01N 2900/04* (2013.01); *F01N 2900/1602* (2013.01); *F01N 2900/1812* (2013.01)

(58) Field of Classification Search
    CPC .... B01D 2255/904; Y02A 50/20; Y02T 10/12
    See application file for complete search history.

(56) References Cited

U.S. PATENT DOCUMENTS

| | | | |
|---|---|---|---|
| 9,255,508 B2* | 2/2016 | Yacoub | F01N 3/2053 |
| 2010/0077736 A1* | 4/2010 | Morishima | F01N 3/0878 60/288 |
| 2010/0326057 A1* | 12/2010 | Ono | B01D 53/9481 60/287 |
| 2011/0041481 A1* | 2/2011 | Fujita | F01N 3/106 60/287 |
| 2011/0058999 A1 | 3/2011 | Ettireddy et al. | |
| 2013/0167510 A1* | 7/2013 | Harmsen | F01N 13/009 60/299 |
| 2021/0164374 A1 | 6/2021 | Chapman et al. | |
| 2022/0213824 A1* | 7/2022 | Zhang | F01N 13/0093 |

FOREIGN PATENT DOCUMENTS

| | | |
|---|---|---|
| EP | 3084158 B1 | 6/2019 |
| WO | 20108774 A1 | 1/2010 |

OTHER PUBLICATIONS

Extended European Search Report in corresponding European Application No. 21215896.8 dated May 24, 2022 (6 pages).

Jonathan Aguilar et al.; "Catalyst Ammonia Storage Measurements Using Radio Frequency Sensing"; Proceedings of the ASME 2017 Internal Combustion Engine Division Fall Technical Conference ICEF2017; Oct. 15-18, 2017, Seattle, Washington, USA; 9 pages.

* cited by examiner

METHOD FOR CONTROLLING THE OPERATION OF AN EXHAUST AFTERTREATMENT SYSTEM

TECHNICAL FIELD

The present invention relates to a method for controlling the operation of an exhaust aftertreatment system, EATS, in a vehicle, and to an EATS of a vehicle. The invention further relates to a vehicle, a computer program, a compute readable medium and to a control unit.

BACKGROUND

A vehicle typically comprises an engine for propelling the vehicle. The engine may be an internal combustion engine powered by e.g. liquid or gaseous fuel, or it may be an electric machine powered by electricity. Moreover, hybrid solutions exist in which the vehicle is propelled both by an internal combustion engine and an electric machine.

In case the engine is a combustion engine, such as e.g. a diesel engine, it is common to provide the vehicle with an exhaust aftertreatment system, EATS, to handle emissions from the engine. An EATS for a diesel engine typically includes one or more of the following components: a diesel oxidation catalyst, DOC, a diesel particulate filter, DPF, and a selective catalytic reduction SCR catalyst. A reductant, such as urea or an ammonia comprising substance, is typically injected upstream of the SCR catalyst to assist in converting nitrogen oxides, also referred to as NOx, with the aid of a catalyst into diatomic nitrogen, N2, and water, and potentially carbon dioxide CO2 (depending on the choice of the reductant). The cleaned, or at least emission reduced, exhaust gases then leave the EATS and the vehicle through the tailpipe of the vehicle. Other types of engines causing at least partly similar emissions as the diesel engine may utilize the same, or a similar, EATS.

Government regulations, together with a constant demand for improved fuel economy of the vehicle, implies a need for a more efficient operation of the EATS. For example, it is desirable that the EATS heat up fast and have a high conversion efficiency also at very low loads, and at cold-start of the engine when the temperature of the exhaust gases is low. The need of very efficient engines for meeting stringent CO2-requirements also leads to lower temperature of the exhaust gases and higher engine out NOx-levels which requires large amounts of reductant to be injected upstream the SCR catalyst. A further option is to provide the EATS with a pre-SCR catalyst arranged upstream of the SCR catalyst, the latter then being referred to as a main SCR catalyst. However, operation of an EATS comprising a pre-SCR catalyst and a main SCR catalyst is more complex as the performance of the pre-SCR catalyst is at least partly dependent on the performance of the main SCR catalyst, and vice versa, as the two SCR catalysts serve the same purpose of reducing NOx emission. There is thus a need in the industry for an improved control of EATS comprising a pre-SCR catalyst and a main SCR catalyst to reduce emissions from the vehicle.

SUMMARY

It is an object of the present invention to at least partly alleviate the shortcomings discussed above in relation to known exhaust aftertreatment systems and provide an improved method for controlling the operation of an exhaust aftertreatment system.

According to a first aspect of the present invention, a method for controlling the operation of an exhaust aftertreatment system, EATS, in a vehicle is provided. The EATS comprises a fluid channel for providing a fluid pathway for the exhaust gases, a main SCR catalyst and a pre-SCR catalyst arranged in the fluid channel, the pre-SCR catalyst being arranged upstream the main SCR catalyst, a pre-injector arranged upstream the pre-SCR catalyst for providing reductant to the pre-SCR catalyst, a bypass channel fluidly connected to the fluid channel and arranged to bypass the pre-SCR-catalyst and the pre-injector, and a valve configured to control a split of exhaust gases between the pre-SCR catalyst and the bypass channel, the method comprising:

determining the amount of ammonia stored in the pre-SCR catalyst;
determining the temperature of the main SCR catalyst;
in response of determining that the ammonia storage in the pre-SCR catalyst is below an ammonia storage threshold and that the temperature of the main SCR catalyst is above a temperature threshold, injecting reductant by the pre-injector and controlling the valve to allow a flow of exhaust gases to the pre-SCR catalyst sufficient for transporting the injected reductant to the pre-SCR catalyst for increasing the ammonia storage.

Hereby, the EATS may operate in an acceptable or desirable manner by the main SCR catalyst as the temperature thereof is above the temperature threshold, while enabling the ammonia storage of the pre-SCR catalyst to be increased. Thus, the pre-SCR catalyst is prepared for future operational modes in which the pre-SCR catalyst, and its ammonia storage, can be used (e.g. to reduce cold start emissions). The valve is thus controlled to allow a flow of exhaust gases to the pre-SCR catalyst to obtain an ammonia storage of the pre-SCR catalyst. Such flow, or sufficient flow, for transporting the injected reductant to the pre-SCR catalyst for increasing the ammonia storage may for example be achieved by controlling the valve such that the split of exhaust gases between the pre-SCR catalyst and the bypass channel is between 1:5 to 1:20 (for example based on volume, or volume flow). Thus, a majority of the flow of exhaust gases can be led to the main SCR catalyst via the bypass channel. As the temperature of the main SCR catalyst is above the temperature threshold, the temperature is typically sufficiently high for handling the majority of the NOx emissions. However, the valve may be controlled such that the split of exhaust gases between the pre-SCR catalyst and the bypass channel is lower, e.g. between 1:3 to 1:5, as a higher flow of exhaust gases to the pre-SCR catalyst may be desired. Alternatively, at least for a short time period, the valve may be controlled to prevent a flow of exhaust gases in the bypass channel, and enable the complete flow of exhaust gases to the pre-SCR catalyst.

It should be understood that the exhaust gases passing the pre-SCR catalyst is typically mixed with the exhaust gases passing the bypass channel, downstream of the pre-SCR catalyst (and upstream of the main SCR-catalyst).

According to at least one example embodiment, the method further comprises:

in response of determining that the ammonia storage in the pre-SCR catalyst is above the ammonia storage threshold, and that the temperature of the main SCR catalyst is below the temperature threshold, injecting reductant by the pre-injector and controlling the valve to allow a flow of exhaust gases to the pre-SCR catalyst sufficient for converting between 90% and 100% of the NOx fed to the pre-SCR catalyst.

Hereby, the EATS may operate in an acceptable manner even though the temperature of the main SCR catalyst is below the temperature threshold, as the pre-SCR catalyst is capable of converting between 90% and 100% of the NOx fed to the pre-SCR catalyst (owing to that the ammonia storage in the pre-SCR catalyst is above the ammonia storage threshold). Moreover, by injecting reductant by the pre-injector while providing an ammonia storage in the pre-SCR catalyst above the ammonia storage threshold, at least some of the ammonia storage in the pre-SCR catalyst may be maintained during the NOx conversion by the pre-SCR catalyst. Hereby, the EATS is advantageously prepared for future operational modes in which the pre-SCR catalyst, and its ammonia storage, can be used. Any flow of exhaust gases not directed to the pre-SCR catalyst is by-passed the pre-SCR catalyst via the bypass channel. Thus, the method may comprise controlling the valve to allow a flow of exhaust gases to the pre-SCR catalyst sufficient for converting between 90% and 100% of the NOx fed to the pre-SCR catalyst, and to allow the remaining flow of exhaust gases to the bypass channel. As an alternative, the method comprises controlling the valve to allow a flow of exhaust gases to the pre-SCR catalyst sufficient for converting between 80% and 100% of the NOx fed to the pre-SCR catalyst.

According to at least one example embodiment, the valve is controlled to allow a flow of exhaust gases to the pre-SCR catalyst which is adapted to the ammonia storage in the pre-SCR catalyst. For example, the flow of exhaust gases to the pre-SCR catalyst is adapted to the ammonia storage in the pre-SCR catalyst resulting in the conversion of NOx fed to the pre-SCR catalyst to be between 90% and 100%.

The conversion of NOx in percentage is typically referring to weight (g). For example, by stating that 90% of the NOx is converted in the pre-SCR catalyst, 90 wt % of the NOx as compared to the total weight of the NOx fed to the pre-SCR catalyst is converted.

According to at least one example embodiment, the method further comprises:
continuously controlling the valve such that the split of exhaust gases between the pre-SCR catalyst and the bypass channel is set at least in response to the ammonia storage in the pre-SCR catalyst and the temperature of the main SCR catalyst.

Thus, the ammonia storage in the pre-SCR catalyst and the temperature of the main SCR catalyst may be used as input data to the continuous control of the valve. Hereby, the split of exhaust gases between the pre-SCR catalyst and the bypass channel, and hence the NOx conversion by the pre-SCR catalyst and the main SCR catalyst can be adapted at least in response to the ammonia storage in the pre-SCR catalyst and the temperature of the main SCR catalyst. The valve is preferably continuously controlled as this enables the split of exhaust gases between the pre-SCR catalyst and the bypass channel to be adapted in a quick manner. For example, continuously controlling the valve may imply that the input data (i.e. respective data values of at least the ammonia storage in the pre-SCR catalyst and the temperature of the main SCR catalyst) to the valve are time-continuous signals, e.g. by a sampling frequency of between 0.01 to 1 Hz.

It should be understood that controlling the valve to allow a flow of exhaust gases to the pre-SCR catalyst and/or controlling the valve to allow a flow of exhaust gases to the bypass channel may be referred to as controlling the valve such that a split of exhaust gases between the pre-SCR catalyst and the bypass channel is achieved. That is, the valve is operable to control a flow of exhaust gases to the pre-SCR catalyst and to control a flow of exhaust gases to the bypass channel, such that a split of exhaust gases between the pre-SCR catalyst and the bypass channel is achieved.

According to at least one example embodiment, the method further comprises:
determining the amount of NOx received by the EATS, wherein the continuously controlling the valve is further set at least in response to the determined amount of received NOx.

Thus, in addition to the ammonia storage in the pre-SCR catalyst and the temperature of the main SCR catalyst, the amount of NOx received by the EATS may be used as input data to the continuous control of the valve. Hereby, the split of exhaust gases between the pre-SCR catalyst and the bypass channel, and hence the NOx conversion by the pre-SCR catalyst and the main SCR catalyst can be further adapted at least in response to the amount of NOx received by the EATS. The amount of NOx received by the EATS may be the engine-out NOx.

According to at least one example embodiment, the method further comprises:
controlling the valve such that the split of exhaust gases between the pre-SCR catalyst and the bypass channel is, in at least one operational mode, between 1:3 to 1:5.

Thus, the valve is operable to split the flow exhaust gases between the pre-SCR catalyst and the bypass channel. Thus, by the split of between 1:3 to 1:5, the pre-SCR catalyst receives between 20% to 33% of the flow, typically measured by volume. Such flow of exhaust gases to the pre-SCR catalyst is according to at least one example embodiment sufficient for converting between 90% and 100% of the NOx fed to the pre-SCR catalyst, as previously described. Moreover, by controlling the valve to allow the remaining flow of exhaust gases to the bypass channel, any particulate filter (e.g. DPF) arranged downstream of the pre-SCR catalyst, and downstream of the bypass channel, may be subject to regeneration.

According to at least one example embodiment, the temperature threshold of the main SCR catalyst corresponds to a predetermined temperature of the main SCR catalyst.

According to at least one example embodiment, the temperature threshold of the main SCR catalyst corresponds to a temperature of 200° C., or 250° C.

Such temperature threshold is preferred, as below the temperature threshold, the valve may be controlled in such a way that the pre-SCR catalyst is advantageously converting NOx (e.g. by controlling the valve such that the split of exhaust gases between the pre-SCR catalyst and the bypass channel is between 1:3 to 1:5), while above the temperature threshold, the valve may be controlled in such a way that the main SCR catalyst is advantageously converting NOx (e.g. by controlling the valve such that the split of exhaust gases between the pre-SCR catalyst and the bypass channel is between 1:5 to 1:20, or between 1:10 to 1:20). According to at least one example embodiment, the temperature threshold of the main SCR catalyst corresponds to a temperature of 300° C. Alternatively, the temperature threshold is determined in relation to a predetermined operating temperature of the main SCR catalyst. For example, the temperature threshold of the main SCR catalyst may correspond to a temperature of 100° C., or 200° C. within the predetermined operating temperature of the main SCR catalyst. The pre-determined operating temperature of the main SCR catalyst may e.g. be the normal operating temperature of the main SCR catalyst, and may e.g. be between 300° C. and 500° C.

Above the temperature threshold, the temperature of the main SCR catalyst is relatively warm, and may advantageously convert NOx. The step of determining that the temperature of the main SCR catalyst is above the temperature threshold typically comprises the step of comparing the determined temperature of the main SCR catalyst with the temperature threshold. Hereby, it can be easily established whether the temperature of the main SCR catalyst is above the temperature threshold or not.

According to at least one example embodiment, the ammonia storage threshold of the pre-SCR catalyst corresponds to a predetermined operating level of ammonia storage.

Having a predetermined operating level of ammonia storage as the ammonia storage threshold is preferred, as the valve may then be controlled in a predetermined way such that the ammonia storage of the pre-SCR catalyst is increased (e.g. by controlling the valve such that the split of exhaust gases between the pre-SCR catalyst and the bypass channel is between 1:5 to 1:20) when the determined ammonia storage is below the ammonia storage threshold, while the valve may additionally be controlled in a predetermined way such that the pre-SCR catalyst converts between 90% and 100% of the NOx fed to the pre-SCR (e.g. by controlling the valve such that the split of exhaust gases between the pre-SCR catalyst and the bypass channel is between 1:3 to 1:5), when the determined ammonia storage is above the ammonia storage threshold. The predetermined operating level of ammonia storage in the pre-SCR catalyst may e.g. be between 2 g and 3 g. The step of determining that the ammonia storage in the pre-SCR catalyst is above the ammonia storage threshold typically comprises the step of comparing the determined ammonia storage in the pre-SCR catalyst with the ammonia storage threshold. Hereby, it can be easily established whether the ammonia storage in the pre-SCR catalyst is above the ammonia storage threshold or not.

According to at least one example embodiment, the method comprises:
  increasing the ammonia storage in the pre-SCR catalyst to a level above the ammonia storage threshold;
  in response of that the ammonia storage threshold is reached, and that the temperature of the main SCR catalyst is above the temperature threshold, controlling the valve such that the split of exhaust gases between the pre-SCR catalyst and the bypass channel is between 1:10 to 1:20, or such that the pre-SCR is fully bypassed.

Hereby, the valve may be controlled in such a way that the main SCR catalyst is advantageously used for converting NOx. Thus, the EATS may be operated in such a way that the main SCR catalyst is converting all of, or at least a majority of, the NOx in the exhaust gases, while the ammonia storage in the pre-SCR catalyst is at an adequate or satisfactory level for future operational modes (in which the pre-SCR catalyst, and its ammonia storage, can be advantageously used). In other words, as the ammonia storage of the pre-SCR catalyst has been raised to a level above the ammonia storage threshold, and as the temperature of the main SCR catalyst is above the temperature threshold, the main SCR catalyst may be used to handle all of, or at least a majority of, the NOx in the exhaust gases, while the pre-SCR catalyst may be subordinated (only used for handling a minority of the NOx in the exhaust gases), or put at rest with an adequate or satisfactory level of ammonia storage. Bypassing the pre-SCR catalyst may additionally result in that the temperature of the pre-SCR catalyst is retained for a longer time during e.g. a cool down period, due to the lack of flow of exhaust gases passing through the pre-SCR catalyst. Upon re-use of the pre-SCR catalyst after the cool down period, the still warm pre-SCR catalyst may aid in further reducing cold start emissions.

According to at least one example embodiment, the method further comprises:
  in response of that the temperature of the main SCR catalyst drops below the temperature threshold, controlling the valve to allow a flow of exhaust gases to the pre-SCR catalyst sufficient for converting between 90% and 100% of the NOx fed to the pre-SCR.

Thus, that the temperature of the main SCR catalyst drops below the temperature threshold may correspond to such previously referred to future operational modes in which the pre-SCR catalyst, and its ammonia storage, can be advantageously used. As the temperature of the main SCR catalyst drops below the temperature threshold, the capability of converting NOx by the main SCR catalyst is reduced, and it is beneficial to control the valve to increase the relative amount of exhaust gases to the pre-SCR catalyst (having an ammonia storage above the ammonia storage threshold).

According to a second aspect of the present invention, an exhaust aftertreatment system, EATS, of a vehicle, is provided. The EATS comprises:
  a fluid channel for providing a fluid pathway for the exhaust gases,
  a main SCR catalyst and a pre-SCR catalyst arranged in the fluid channel, the pre-SCR catalyst being arranged upstream the main SCR catalyst,
  a pre-injector arranged upstream the pre-SCR catalyst for providing reductant to the pre-SCR catalyst,
  a bypass channel fluidly connected to the fluid channel and arranged to bypass the pre-SCR-catalyst and the pre-injector, and
  a valve configured to control a split of exhaust gases between the pre-SCR catalyst and the bypass channel, wherein the EATS further comprises a control unit configured to
  acquire the amount of ammonia stored in the pre-SCR catalyst;
  acquire the temperature of the main SCR catalyst;
  in response of determining that the ammonia storage in the pre-SCR catalyst is below an ammonia storage threshold and that the temperature of the main SCR catalyst is above a temperature threshold, control injection of reductant by the pre-injector and control the valve to allow a flow of exhaust gases to the pre-SCR catalyst sufficient for transporting the injected reductant to the pre-SCR catalyst for increasing the ammonia storage.

Effects and features of the second aspect of the invention are largely analogous to those described above in connection with the first aspect of the invention. Embodiments mentioned in relation to the first aspect of the invention are largely compatible with the second aspect of the invention, of which some are exemplified below. The control unit is typically further configured to operate the valve in response to input data of at least the acquired ammonia storage in the pre-SCR catalyst and the acquired temperature of the main SCR catalyst, and possibly acquired amount of NOx received by the EATS.

According to at least one example embodiment, the EATS further comprises a temperature sensor arranged to measure the temperature of the main SCR catalyst and/or further comprises an ammonia sensor arranged to measure the ammonia storage of the pre-SCR catalyst.

Hereby, a reliable means for providing the temperature of the main SCR catalyst is provided, and/or for providing the ammonia storage of the pre-SCR catalyst is provided. Thus, the temperature of the main SCR catalyst may be performed by means of the temperature sensor. For example, the temperature sensor may be arranged in, or in close proximity to, the main SCR catalyst. According to at least one example embodiment, the temperature sensor is arranged adjacent upstream, inside, or adjacent downstream of the SCR catalyst. The ammonia sensor may e.g. be an ammonia sensor arrangement comprising ammonia sensors or NOx sensors prior and/or after the pre-SCR catalyst, which sensors are used to determine the amount of ammonia stored in the pre-SCR catalyst. Other means for determining the ammonia storage of the pre-SCR catalyst is conceivable, e.g. using a radio frequency-based method as described in in the publication by Proceedings of the ASME 2017 Internal Combustion Engine Division Fall Technical Conference, ICEF2017, Oct. 15-18, 2017, Seattle, Washington, USA "CATALYST AMMONIA STORAGE MEASUREMENTS USING RADIO FREQUENCY SENSING", J. Aguilar, L. Bromberg, A. Sappok, P. Ragaller, J. Atehortua, X. Liu, This document may be found at https://www.osti.gov/servlets/purl/1477841 (available at the date of priority of the present application). Such means for determining the ammonia storage of the pre-SCR catalyst is also applicable to the first aspect of the invention. As a further alternative, the ammonia storage of the pre-SCR catalyst may be determined by means of antenna elements and corresponding microwave signals, as described in the European patent EP3084158B1. As a further option, the ammonia storage of the pre-SCR catalyst may be calculated based on known system characteristics and input data. Thus, the ammonia storage of the pre-SCR catalyst may be modelled, or estimated, by means of an ammonia storage model.

According to a third aspect of the present invention, a vehicle comprising an EATS according to the second aspect of the invention is provided.

According to a fourth aspect of the present invention, a computer program comprising program code means comprising instructions to cause the EATS of the second aspect of the present invention to execute the steps of the method of the first aspect of the present invention, when said program is run on a computer, is provided.

According to a fifth aspect of the present invention, a computer readable medium carrying a computer program comprising program code means comprising instructions to cause the EATS of the second aspect of the present invention to execute the steps of the method of the first aspect of the present invention when said computer program is run on a computer, is provided.

According to a sixth aspect of the present invention, a control unit for controlling the operation of an EATS in a vehicle is provided. The control unit is configured to perform the steps of the first aspect of the present invention.

Thus, the control unit may be configured to:
acquire the amount of ammonia stored in the pre-SCR catalyst;
acquire the temperature of the main SCR catalyst;
in response of determining that the ammonia storage in the pre-SCR catalyst is below an ammonia storage threshold and that the temperature of the main SCR catalyst is above a temperature threshold, control injection of reductant by the pre-injector and control the valve to allow a flow of exhaust gases to the pre-SCR catalyst sufficient for transporting the injected reductant to the pre-SCR catalyst for increasing the ammonia storage. The control unit is typically further configured to operate the valve in response to input data of at least the acquired ammonia storage in the pre-SCR catalyst and the acquired temperature of the main SCR catalyst, and possibly acquired amount of NOx received by the EATS. Moreover, the control unit may be configured to determine the temperature of the main SCR catalyst, e.g. by measuring the temperature by means of the temperature sensor, and/or be configured to determine the ammonia storage in the pre-SCR catalyst, e.g. by using the ammonia sensor or ammonia sensor arrangement. Stated differently, the control unit may be configured to instruct the EATS to perform at least some steps of the method of the first aspect of the invention Effects and features of the third to sixth aspects of the invention are largely analogous to those described above in connection with the first and second aspects of the invention. Embodiments mentioned in relation to the first and second aspects of the invention are largely compatible with the third to sixth aspects of the invention.

For all of the first to sixth aspects of the invention, the main SCR catalyst may be comprised in the main muffler of the vehicle. Additionally or alternatively, the EATS may comprise an oxidation catalyst, e.g. a diesel oxidation catalyst (abbreviated DOC) and/or a particulate filter, e.g. a diesel particulate filter (abbreviated DPF). The oxidation catalyst and/or the particular filter is advantageously arranged downstream of the pre-SCR catalyst and the bypass channel, and upstream of the main SCR catalyst. Additionally or alternatively, the EATS may comprise a main injector arranged upstream the main SCR catalyst for providing reductant to the main SCR catalyst.

The order of the method steps described in the first aspect of the invention is not constrained to that described in the present disclosure. One or several of the steps could switch places, or occur in a different order, unless explicitly stated so without departing from the scope of the invention. However, according to at least one example embodiment, the method steps are performed in the order described in the first aspect of the invention.

According to at least one example embodiment, applicable to any one of the first to sixth aspects of the invention, the EATS forms part of an engine system, wherein the EATS is configured for converting NOx emissions in the exhaust gases from an engine of a vehicle, e.g. a heavy duty truck. The EATS may be used for cleaning exhaust gases from various types of engines, such as e.g. engines using diesel, petrol, hydrogen or gaseous fuels as fuel. For example, the present EATS may be used to clean exhaust gases by converting NOx emissions from the exhausts of internal combustion engines using diesel, petrol, CNG (Compressed Natural Gas), LPG (Liquified Pressurized Gas), DME (DiMethylEther), and/or H2 (Hydrogen) as fuel.

Further advantages and features of the present disclosure are disclosed and discussed in the following description and the accompanying drawings.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
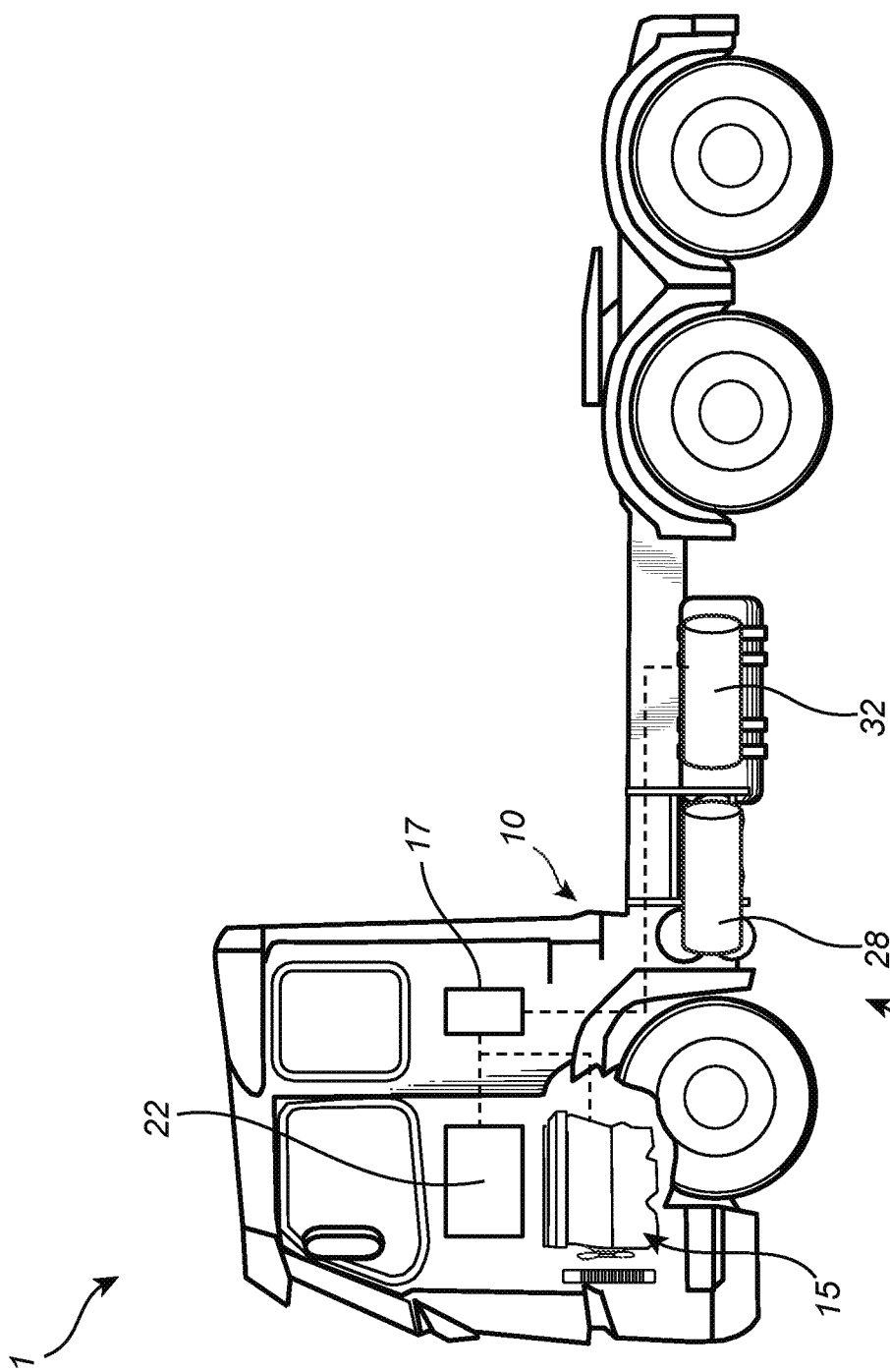
FIG. 1 is a schematic side view of a vehicle comprising an engine system, and an exhaust aftertreatment system of the engine system, in accordance with an example embodiment of the invention.

With reference to FIG. 1 a vehicle 1, here embodied as a heavy duty truck 1, comprising an engine system 10 is shown for which an EATS 20 of a kind disclosed in the present disclosure is advantageously comprised in. However, the EATS 20 may as well be implemented in other types of vehicles, such as in busses, light-weight trucks, passenger cars, marine applications etc. having similar engine systems. The vehicle 1 of FIG. 1 is a hybrid vehicle 1 comprising an engine 15, which in this embodiment is a diesel engine 15, and an electric machine 22. The diesel engine 15 is powered by diesel fuel, typically comprised in a fuel tank (not shown) and the electric machine 22 is powered by electricity supplied from at least one energy storage or transformation device, e.g. a battery or a fuel cell. The diesel engine 15 and the electric machine 22 are typically arranged and configured to individually propel the vehicle 1, by being separately coupled to other parts of the powertrain of the vehicle 1, such as transmission, drive shafts and wheels (not shown in detail). That is, the vehicle 1 may be propelled by the diesel engine 15 alone, the electric machine 22 alone, or by the diesel engine 15 together with the electric machine 22. Moreover, the vehicle 1 comprises a control unit 17 configured to control the operation of the EATS 20 as will be described in more detail later in the text.

In FIG. 1, at least the diesel engine 15 is comprised in the engine system 10, the engine system 10 further comprising the EATS 20 having at least a pre-SCR catalyst 28 and a main SCR catalyst 32. Both the pre-SCR catalyst 28 and the main SCR catalyst 32 are configured to convert nitrogen oxides, referred to as NOx, with the aid of a catalyst, into diatomic nitrogen, N2, and water, H2O, and potentially carbon dioxide, CO2. The EATS 20 further comprises a pre-injector (shown in FIG. 2) configured to provide a reductant, such as an ammonia-based reductant, typically anhydrous ammonia, aqueous ammonia or urea solution (commonly referred to as reductant in the present disclosure), to the pre-SCR catalyst 28, and a main injector (shown in FIG. 2) configured to provide a corresponding reductant to the main SCR catalyst 32. The ammonia is absorbed onto the catalyst in the pre-SCR catalyst 28 and the main SCR catalyst 32. The ammonia is typically stored on surfaces of the catalyst, and at times, such as when flow of exhaust gases commences, an excess of ammonia may be introduced for building the quantity of ammonia stored on the pre-SCR catalyst 28 and possibly the main SCR catalyst 32. Thus, the pre-SCR catalyst 28, and possibly the main SCR catalyst 32, are configured to store ammonia. When the quantity of ammonia stored on the catalyst reaches a maximum ammonia storage capacity, any quantity of ammonia in excess of the quantity needed to reduce NOx is not consumed and instead passed downstream of the pre-SCR catalyst 28 and/or the main SCR catalyst 32. Any ammonia slipped out of the EATS 20 may be referred to as ammonia slip.

Figure 2:
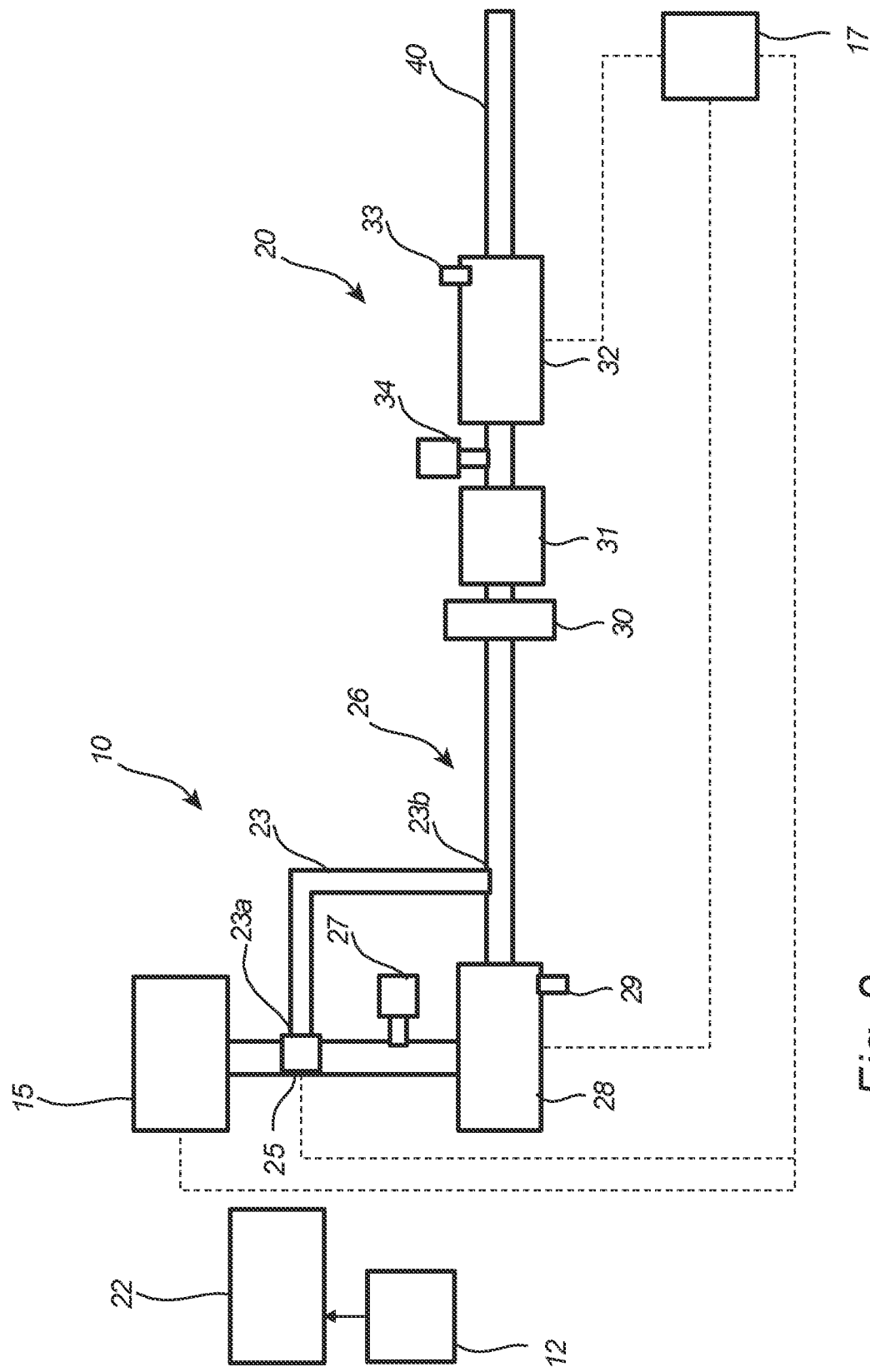
FIG. 2 is a schematic view of an engine system, and an exhaust aftertreatment system of the engine system, of a vehicle in accordance with example embodiments of the invention.

FIG. 2 discloses the engine system 10 of vehicle 1 of FIG. 1 in more detail. The engine system 10 comprises, as already described with reference to FIG. 1, a diesel engine 15 and an EATS 20 having a pre-SCR catalyst 28 and a main SCR catalyst 32, and a control unit 17 which is configured to control the operation of the EATS 20. It should however be mentioned that the control unit 17 may be provided outside of the EATS 20 and/or the engine system 10 and instead be comprised in another part of the vehicle 1. In the embodiment of FIG. 2, the EATS 20 further comprises an oxidation catalyst 30, such as a DOC, and a particulate filter 31, such as a DPF. According to one example embodiment, an ammonia slip catalyst, ASC, is arranged downstream of the pre-SCR catalyst 28 and upstream of the oxidation catalyst 30, for handling any ammonia slip from the pre-SCR catalyst.

In more detail, the EATS 20 comprises a fluid channel 26 for providing a fluid pathway for the exhaust gases from the diesel engine 15 to the outlet portion of the EATS 20. The main SCR catalyst 32 and the pre-SCR catalyst 28 are arranged in the fluid channel 26, such that the pre-SCR catalyst 28 is arranged upstream the main SCR catalyst 32. The pre-SCR catalyst 28 may be described as being connected in series with the main SCR catalyst 32. The previously mentioned pre-injector 27 is in the embodiment in FIG. 2 arranged upstream the pre-SCR catalyst 28 for providing reductant to the pre-SCR catalyst 28, and the previously mentioned main injector 34 is in the embodiment in FIG. 2 arranged upstream the main SCR catalyst 32 for providing reductant to the main SCR catalyst 32. The pre-injector 27 and main injector 34 may e.g. be fluidly connected to a reductant dosing system comprising a storage tank for the reductant and a pressuring means, typically a pump, for pressurising the reductant prior to injection.

The EATS 20 further comprises a bypass channel 23 fluidly connected to the fluid channel 26 and arranged to bypass the pre-SCR-catalyst 28 and the pre-injector 27. Typically, the bypass channel 23 comprises a bypass inlet 23a arranged upstream of the pre-injector 27, and comprises a bypass outlet 23b arranged downstream of the pre-SCR catalyst 28, and upstream of the main SCR catalyst 32. As shown in FIG. 2, the bypass outlet 23b is arranged between the pre-SCR catalyst 28 and the oxidation catalyst 30.

The EATS 20 further comprises a valve 25 configured to control a split of exhaust gases between the pre-SCR catalyst 28 and the bypass channel 23. The valve 25 may e.g. be a controllable valve, such as a e.g. a 3-way gas valve. The valve 25 is typically controlled by the control unit 17 as will be described later.

As previously mentioned, the pre-SCR catalyst 28 is configured to store ammonia. The control unit 17 is configured to acquire the amount of ammonia stored in the pre-SCR catalyst 28. Moreover, the control unit 17 is configured to acquire the temperature of the main SCR catalyst 32. Thus, the EATS 20 typically comprises means for providing determination/measurement of the ammonia storage of the pre-SCR catalyst 28 and the temperature of the main SCR catalyst 32. For such purposes, the EATS 20 may comprise a temperature sensor 33 arranged to measure the temperature of the main SCR catalyst 32 and/or an ammonia sensor 29 arranged to measure the ammonia storage of the pre-SCR catalyst 28. It should be noted that the ammonia sensor 29 is schematically illustrated in the embodiment of FIG. 2, and that the ammonia storage in the pre-SCR catalyst 28 may be determined using an ammonia sensor arrangement comprising ammonia sensors or NOx sensors prior and/or after the pre-SCR catalyst 28, which sensors are used to determine the amount of ammonia stored in the pre-SCR catalyst 28. The ammonia storage in the pre-SCR catalyst 28 may alternatively be determined as described previously in the description.

Upon engine start and during the initial operation of engine system 10, e.g. up to 10-15 minutes of operation or up to a point in time at which the operating conditions of the engine system 10 has been reached (e.g. up to a point in time at which the operating temperature of the main SCR catalyst 32), the emissions (e.g. emissions per travelled distance, or emissions per unit operational time) out of the EATS 20 are typically higher compared to when the operating conditions of the engine system 10 has been reached. Such emissions may be referred to as cold-start emissions and they typically comprise undesired compounds (such as NOx, particles, and CO or unburned HC) in the exhaust out from the EATS 20. The initial operation of the engine system 10 is an example of an operational mode of the EATS 20. Moreover, other operational modes of the EATS 20 exists in which the capability of the SCR catalyst to convert NOx is of similarly high importance (e.g. when the temperature of the EATS 20 and/or the main SCR catalyst 32 for some reasons are lower than the normal operating temperature). For example, for a hybrid vehicle, such operational models may occur after a time of operation by the electric machine. As described with reference to FIG. 1, the engine system 10 may comprise an electric machine 22 powered by electricity supplied from at least one energy storage or transformation device 12, e.g. a battery or a fuel cell. By propelling the vehicle 1 using different drive cycles, the emissions out of the EATS may vary e.g. as the temperature of the main SCR catalyst 32 vary. For example, the vehicle 1 may be operated by three subsequent drive cycles being a first drive cycle in which the diesel engine 15 is operated to propel the vehicle 1, possibly together with the electric machine 22, and a second drive cycle in which the diesel engine 15 is shut-off and only the electric machine 22 is operated to propel the vehicle 1 (or the electric machine 22 is also shut-off and the vehicle is at stand-still), and a third drive cycle in which the diesel engine 15 is re-started in order to propel the vehicle 1. Between the second and third drive cycles, the temperature of the EATS 20, and in particular the temperature of the main SCR catalyst 32, will begin to decrease below its operating temperature.

Thus, during such third drive cycle of the engine system 10, the capability of the SCR catalyst, i.e. the pre-SCR catalyst 28 and the main SCR catalyst 32, to convert NOx is of high importance.

The control unit 17 of the vehicle 1 is configured to control the operation of the EATS 20. In more detail, the control unit 17 is configured to, in response of determining that the ammonia storage in the pre-SCR catalyst 28 is below an ammonia storage threshold and that the temperature of the main SCR catalyst 32 is above a temperature threshold, control injection of reductant by the pre-injector 27 and control the valve 25 to allow a flow of exhaust gases to the pre-SCR catalyst 28 sufficient for transporting the injected reductant to the pre-SCR catalyst 28 for increasing the ammonia storage. Thus, an increased ammonia storage of the pre-SCR catalyst 28 can be obtained. Hereby, the EATS 20 may operate in an acceptable or desirable manner by the main SCR catalyst 32 (as the temperature thereof is above the temperature threshold) while enabling the ammonia storage of the pre-SCR catalyst 28 to be increased. Hereby, the pre-SCR catalyst 28 is prepared for future operational modes in which the pre-SCR catalyst, and its ammonia storage, can be used (e.g. to reduce cold start emissions).

Figure 3:
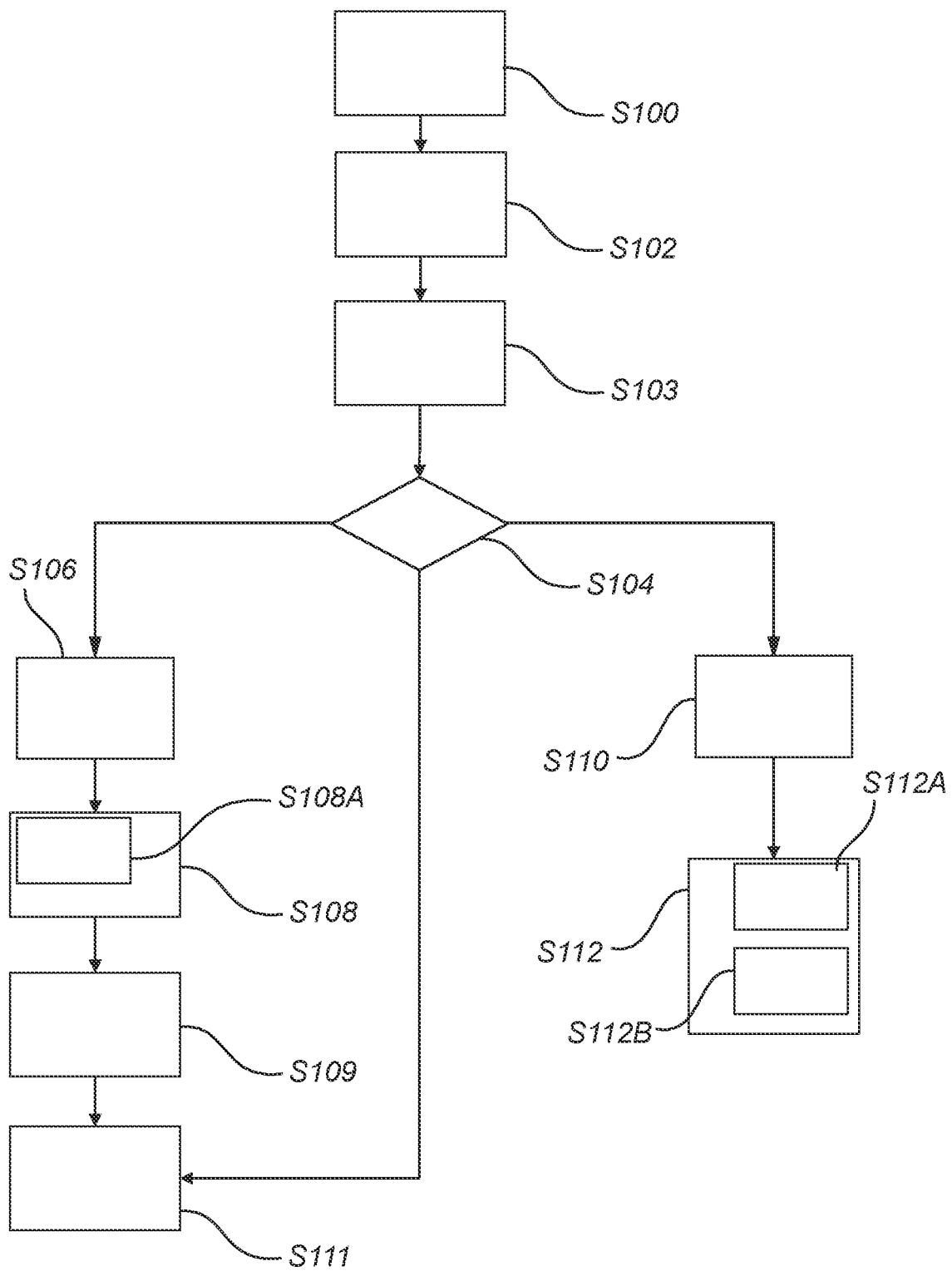
FIG. 3 is a flowchart illustrating the steps of a method in accordance with example embodiments of the invention.

The control unit 17 may be further configured to control the valve 15 for various operational mode as will be described in the following with reference to the flowchart of FIG. 3. FIG. 3 schematically illustrates the steps of a method for controlling the operation of an exhaust aftertreatment system, such as EATS 20 of FIG. 2, in a vehicle. Thus, the EATS 20 comprises a fluid channel 26 for providing a fluid pathway for the exhaust gases, a main SCR catalyst 32 and a pre-SCR catalyst 28 arranged in the fluid channel 26, the pre-SCR catalyst 28 being arranged upstream the main SCR catalyst 32. The EATS 20 further comprises at least a pre-injector 27 arranged upstream the pre-SCR catalyst 28 for providing reductant to the pre-SCR catalyst 28, a bypass channel 23 fluidly connected to the fluid channel 26 and arranged to bypass the pre-SCR-catalyst 28 and the pre-injector 27, and a valve 25 configured to control a split of exhaust gases between the pre-SCR catalyst 28 and the bypass channel 23.

In a step S100, e.g. being a first step S100, the amount of ammonia stored in the pre-SCR catalyst 28 is determined, referred to as the determined ammonia storage in the following. This may be determined by the ammonia sensor 29 or an ammonia sensor arrangement comprising ammonia sensors or NOx sensors prior and/or after the pre-SCR catalyst 28, which sensors are used to determine the amount of ammonia stored in the pre-SCR catalyst 28. The ammonia storage of the pre-SCR catalyst 28 may alternatively be determined using another type of determining means, e.g. using a radio frequency-based method, as previously described.

In a step S102, e.g. being a second step S102, the temperature of the main SCR catalyst 32 is determined, referred to as the determined temperature in the following. As described with reference to FIG. 2, the EATS 20 may comprise a temperature sensor 31 arranged to measure the temperature of the main SCR catalyst 32, wherein the step of determining the temperature of the SCR catalyst S102 is performed by means of the temperature sensor 31.

In an optional step S103, e.g. being a third step S103, the amount of NOx received by the EATS 20 is determined. This may e.g. be determined by a NOx sensor arranged in the fluid channel 26 downstream of the engine 15, and upstream of the bypass inlet 23*a*.

In a step S104, e.g. being a fourth step S104, it is determined whether or not the determined ammonia storage of the pre-SCR catalyst 28 is below an ammonia storage threshold, and it is determined whether or not the main SCR catalyst 32 is above a temperature threshold. The ammonia storage threshold of the pre-SCR catalyst 28 may e.g. correspond to a predetermined operating level of ammonia storage. The temperature threshold of the main SCR catalyst 32 may e.g. correspond to a temperature of 250° C. of the main SCR catalyst 32.

In response of step S104, and the outcome that the determined ammonia storage is below the ammonia storage threshold and that the determined temperature is above the temperature threshold, a step S106 injecting reductant by the pre-injector 27 and a step S108 of controlling the valve 25 to allow a flow of exhaust gases to the pre-SCR catalyst 28 sufficient for transporting the injected reductant to the pre-SCR catalyst 28 for increasing the ammonia storage are performed. Thus, an increased ammonia storage of the pre-SCR catalyst 28 can be obtained. This may e.g. be performed during the previously mentioned first drive cycle. The step S108 of controlling the valve 25 to allow a flow of exhaust gases to the pre-SCR catalyst 28 sufficient for transporting the injected reductant to the pre-SCR catalyst 28 for increasing the ammonia storage may be performed such that the split of exhaust gases between the pre-SCR catalyst 28 and the bypass channel 23 is between 1:5 to 1:20.

In response of step S104, and the outcome that the determined ammonia storage is above the ammonia storage threshold, and that the determined temperature is below the temperature threshold, a step S110 of injecting reductant by the pre-injector 27 and a step S112 of controlling the valve 25 to allow a flow of exhaust gases to the pre-SCR catalyst 28 sufficient for converting between 90% and 100% of the NOx fed to the pre-SCR catalyst 28 are performed. Hereby, the EATS 20 may operate in an acceptable manner even though the temperature of the main SCR catalyst 32 is below the temperature threshold, as the pre-SCR catalyst 28 is capable of converting between 90% and 100% of the NOx fed to the pre-SCR catalyst 28 (owing to that the ammonia storage in the pre-SCR catalyst 28 is above the ammonia storage threshold). This may e.g. be performed during the previously mentioned third drive cycle. The step S112 of controlling the valve 25 to allow a flow of exhaust gases to the pre-SCR catalyst 28 sufficient for converting between 90% and 100% of the NOx fed to the pre-SCR catalyst 28 may be performed such that the split of exhaust gases between the pre-SCR catalyst 28 and the bypass channel 23 is between 1:3 to 1:5, indicated by the sub-step S112B.

Thus, the steps S108, S112 of controlling the valve 25 are dependent at least on the ammonia storage in the pre-SCR catalyst 28 and the temperature of the main SCR catalyst 32 (i.e. at least dependent on steps S100 and S102). Moreover, the steps S108, S112 of controlling the valve 25 may be dependent on the amount of NOx received by the EATS 20 (i.e. the step S103). In other words, the split of exhaust gases between the pre-SCR catalyst 28 and the bypass channel 23 may be set at least in response to the ammonia storage in the pre-SCR catalyst 28 and the temperature of the main SCR catalyst 32, and potentially in response to the determined amount of received NOx. According to at least one example embodiment, the steps S108, S112 of controlling the valve 25 is be performed continuously, indicated by the sub-steps S108A, S112A. Thus, the valve 25 may be continuously controlled.

The method may further comprise the step S109 of increasing the ammonia storage in the pre-SCR catalyst 28 to a level above the ammonia storage threshold, and in response of that the ammonia storage threshold is reached, and that the temperature of the main SCR catalyst 32 is above the temperature threshold (also indicated as a potential outcome of the step S104), performing the step S111 of controlling the valve 25 such that the split of exhaust gases between the pre-SCR catalyst 28 and the bypass channel 23 is between 1:10 to 1:20, or such that the pre-SCR catalyst 28 is fully bypassed. Hereby, the valve 25 may be controlled in such a way that the main SCR catalyst 32 is advantageously used for converting NOx. Thus, the EATS 20 may be operated in such a way that the main SCR catalyst 32 is converting all of, or at least a majority of, the NOx in the exhaust gases, while the ammonia storage in the pre-SCR catalyst 28 is at an adequate or satisfactory level for future operational modes (in which the pre-SCR catalyst 28, and its ammonia storage, can be advantageously used). This may e.g. be performed during the previously mentioned first drive cycle.

The step S102 may comprise the sub-step of comparing the determined temperature of the SCR catalyst with a predetermined threshold of the SCR catalyst temperature It is to be understood that the present invention is not limited to the embodiments described above and illustrated in the drawings; rather, the skilled person will recognize that many changes and modifications may be made within the scope of the appended claims. For example, the EATS may be used for cleaning exhaust gases of other engines than diesel engines. For example, the present EATS may be used to clean exhaust gases, e.g. by converting NOx emissions, from the exhaust of internal combustion engines using petrol, CNG (Compressed Natural Gas), LPG (Liquified Pressurized Gas), DME (DiMethylEther), and/or H2 (Hydrogen) as fuel. Thus, the engine system may comprise another combustion engine than a diesel engine, e.g. a hydrogen engine.

It should be noted that the naming of the steps of FIG. 3 is not necessarily, but might according to at least one example embodiment, relate to the order in which the steps are carried out. Thus, the order of the steps may be different than that explained here, unless explicitly being dependent on each other. Moreover, one or more steps may be omitted, and/or two of the steps may be carried out simultaneously.

Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method for controlling the operation of an exhaust aftertreatment system (EATS) in a vehicle, the EATS comprising a fluid channel for providing a fluid pathway for the exhaust gases, a main SCR catalyst and a pre-SCR catalyst arranged in the fluid channel, the pre-SCR catalyst being arranged upstream the main SCR catalyst, a pre-injector arranged upstream the pre-SCR catalyst for providing reductant to the pre-SCR catalyst, a bypass channel fluidly connected to the fluid channel and arranged to bypass the pre-SCR-catalyst and the pre-injector, and a valve configured to control a split of exhaust gases between the pre-SCR catalyst and the bypass channel, the method comprising:
    determining the amount of ammonia stored in the pre-SCR catalyst;
    determining the temperature of the main SCR catalyst;
    in response of determining that the ammonia storage in the pre-SCR catalyst is below an ammonia storage threshold and that the temperature of the main SCR catalyst is above a temperature threshold, injecting reductant by the pre-injector and controlling the valve to allow a flow of exhaust gases to the pre-SCR catalyst sufficient for transporting the injected reductant to the pre-SCR catalyst for increasing the ammonia storage.

2. The method according to claim 1, further comprising:
    in response of determining that the ammonia storage in the pre-SCR catalyst is above the ammonia storage threshold, and that the temperature of the main SCR catalyst is below the temperature threshold, injecting reductant by the pre-injector and controlling the valve to allow a flow of exhaust gases to the pre-SCR catalyst sufficient for converting between 90% and 100% of the NOx fed to the pre-SCR catalyst.

3. The method according to claim 1, further comprising:
    continuously controlling the valve such that the split of exhaust gases between the pre-SCR catalyst and the bypass channel is set at least in response to the ammonia storage in the pre-SCR catalyst and the temperature of the main SCR catalyst.

4. The method according to claim 3, further comprising:

determining the amount of NOx received by the EATS, wherein the continuously controlling the valve is further set at least in response to the determined amount of received NOx.

5. The method according to claim 1, further comprising: controlling the valve such that the split of exhaust gases between the pre-SCR catalyst and the bypass channel is, in at least one operational mode, between 1:3 to 1:5.

6. The method according to claim 1, wherein the temperature threshold of the main SCR catalyst corresponds to a temperature of 200° C., or 250° C.

7. The method according to claim 1, wherein the ammonia storage threshold of the pre-SCR catalyst corresponds to a predetermined operating level of ammonia storage.

8. The method according to claim 1, comprising:
increasing the ammonia storage in the pre-SCR catalyst to a level above the ammonia storage threshold;
in response of that the ammonia storage threshold is reached, and that the temperature of the main SCR catalyst is above the temperature threshold, controlling the valve such that the split of exhaust gases between the pre-SCR catalyst and the bypass channel is between 1:10 to 1:20, or such that the pre-SCR catalyst is fully bypassed.

9. The method according to claim 8, further comprising:
in response of that the temperature of the main SCR catalyst drops below the temperature threshold, controlling the valve to allow a flow of exhaust gases to the pre-SCR catalyst sufficient for converting between 90% and 100% of the NOx fed to the pre-SCR.

10. An exhaust aftertreatment system, EATS of a vehicle, comprising:
a fluid channel for providing a fluid pathway for the exhaust gases,
a main SCR catalyst and a pre-SCR catalyst arranged in the fluid channel, the pre-SCR catalyst being arranged upstream the main SCR catalyst,
a pre-injector arranged upstream the pre-SCR catalyst for providing reductant to the pre-SCR catalyst,
a bypass channel fluidly connected to the fluid channel and arranged to bypass the pre-SCR-catalyst and the pre-injector, and
a valve configured to control a split of exhaust gases between the pre-SCR catalyst and the bypass channel, wherein the EATS further comprises a control unit configured to
acquire the amount of ammonia stored in the pre-SCR catalyst;
acquire the temperature of the main SCR catalyst;
in response of determining that the ammonia storage in the pre-SCR catalyst is below an ammonia storage threshold and that the temperature of the main SCR catalyst is above a temperature threshold, control injection of reductant by the pre-injector and control the valve to allow a flow of exhaust gases to the pre-SCR catalyst sufficient for transporting the injected reductant to the pre-SCR catalyst for increasing the ammonia storage.

11. The EATS according to claim 10, further comprising a temperature sensor arranged to measure the temperature of the main SCR catalyst and/or further comprises an ammonia sensor arranged to measure the ammonia storage of the pre-SCR catalyst.

12. A vehicle comprising an EATS according to claim 10.

13. A computer program comprising program code comprising instructions to cause the EATS of to execute the steps of the method of claim 1 when said program code is run on a computer.

14. A computer readable medium carrying a computer program comprising program code comprising instructions to cause the EATS to execute the steps of the method of claim 1 when said computer program is run on a computer.

15. A control unit for controlling the operation of an EATS in a vehicle, the control unit being configured to perform the steps of the method according to claim 1.

* * * * *